(12) United States Patent
Haecker et al.

(10) Patent No.: US 6,416,110 B1
(45) Date of Patent: Jul. 9, 2002

(54) PROCESS FOR CONTROLLING A ROOF OF A VEHICLE WHICH IS TO BE OPENED IN A POWER-OPERATED MANNER BY MEANS OF AN OPERATING DEVICE

(75) Inventors: Walter Haecker, Tamm; Hans-Dieter Dahmen, Neuhausen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/258,155

(22) Filed: Feb. 26, 1999

(30) Foreign Application Priority Data

Mar. 4, 1998 (DE) .......................... 198 09 062

(51) Int. Cl.⁷ .................................................. B60J 7/12
(52) U.S. Cl. .................................. 296/107.01; 296/117
(58) Field of Search ........................... 296/107.01, 112, 296/115, 117, 107.08, 107.09

(56) References Cited

U.S. PATENT DOCUMENTS

| | | | | |
|---|---|---|---|---|
| 3,577,164 A | * | 5/1971 | Baratelli et al. | 290/38 |
| 5,225,747 A | * | 7/1993 | Helms et al. | 318/265 |
| 5,355,525 A | * | 10/1994 | Lindmayer et al. | 455/99 |
| 5,451,849 A | | 9/1995 | Porter et al. | 318/466 |
| 5,654,615 A | * | 8/1997 | Brodsky | 318/282 |
| 5,749,617 A | * | 5/1998 | Weissrich et al. | 296/117 X |

FOREIGN PATENT DOCUMENTS

| | | |
|---|---|---|
| DE | 196 15 125 | 10/1997 |
| EP | 0 368 257 | 5/1990 |

* cited by examiner

Primary Examiner—Dennis H. Pedder
(74) Attorney, Agent, or Firm—Crowell & Moring LLP

(57) ABSTRACT

A process for controlling movement of a roof of a vehicle, which is to be opened in a power-operated manner, by means of an operating device. The process for controlling movement of the roof of a vehicle to be opened, which requires only a simplified controlling device, the operating device direction of the roof is selected as a function of the position of the roof.

5 Claims, 2 Drawing Sheets

PROCESS FOR CONTROLLING A ROOF OF A VEHICLE WHICH IS TO BE OPENED IN A POWER-OPERATED MANNER BY MEANS OF AN OPERATING DEVICE

BACKGROUND AND SUMMARY OF THE INVENTION

This application claims the priority of 198 09 062.5, filed Mar. 4, 1998, the disclosure of which is expressly incorporated by reference herein.

The invention relates to a process for controlling a roof of a vehicle, which is to be opened in a power-operated manner.

In known control processes for operating a movable roof of a vehicle, the roof movement is controlled by a device, and the moving direction of the roof is predetermined. One switching position is therefore always provided for "close roof" and another switching position for "open roof".

It is an object of the present invention to provide a process for controlling movement of a roof of a vehicle to be opened or closed by means of a simplified controlling device.

According to the invention, this object is achieved by a process that controls the direction power-operated movement of the roof by selecting the operating direction of the roof as a function of the position of the roof. In this process, advantageously only one controlling device is required which has a single control position.

Thus, in the inventive process, the first step is to examine whether the roof is fully opened. If the result of this examination is positive, the operating device initiates a closing operation. In contrast; if the results of this examination is negative, an opening operation is initiated.

Alternatively the first step may be to examine whether, during a defined time period before the current operation of the controlling device, an operation of the controlling device had taken place. If this examination has a positive result, the operating direction of the roof is reversed with respect to the preceding operation. However, if the result of the examination is negative, the selection of the operating device direction takes place as described above.

The process according to the invention has special advantages when used in conjunction with a remote control. Because of the limited space conditions in the case of a remote control, particularly when the latter is integrated in the head of a key, it is desirable to limit the number of switching functions on the remote control. The process according to the invention, makes it possible to provide only a single switching function for operating the roof on a remote control and nevertheless permit an arbitrary operation of the roof. In this case, the remote control may be provided as an alternative or in addition to a switch fixedly mounted on the vehicle. A switch fixedly arranged on the vehicle can also be reduced in the described manner to a single switching function in order to thus achieve a corresponding control by means of the remote control as well as by means of the fixedly arranged switch.

Finally, it is conceivable for a remote control integrated in the head of a key to combine the switching function for the unlocking and locking of the vehicle with the switching function for operating the roof in order to further reduce the number of switching functions on the remote control. In this case, an operation of the roof will not take place before the switching function has been operated for a defined time period. If a roof operation has already taken place, in the manner described above, by means of another operation of the switching function, the moving direction can be reversed.

Other objects, advantages and novel features of the present invention will become apparent from the following detailed description of the invention when considered in conjunction with the accompanying drawings.

BRIEF DESCRIPTION OF THE DRAWINGS

The invention will be described in detail in the following by means of the embodiment illustrated in the drawings.

DETAILED DESCRIPTION OF THE DRAWINGS

Figure 1:
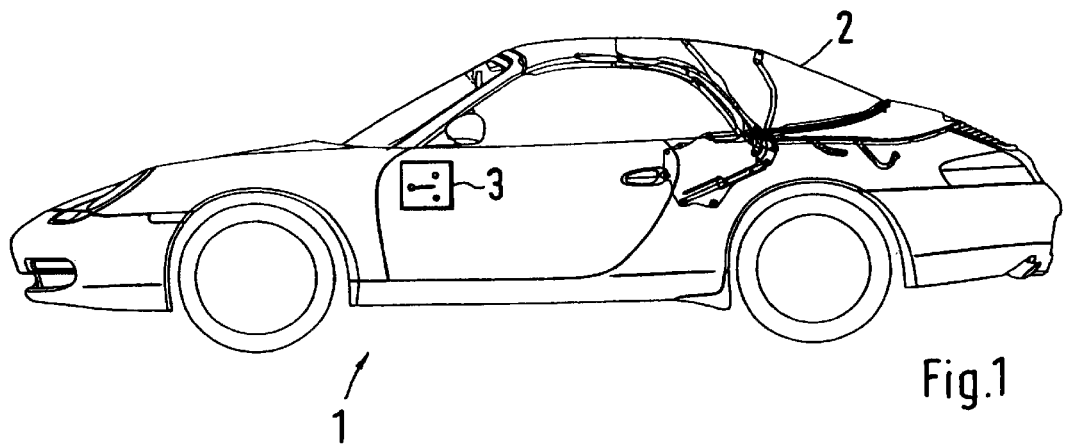
FIG. 1 is a view of a vehicle with a folding top, in which the folding top is in its closed position.
Figure 2:
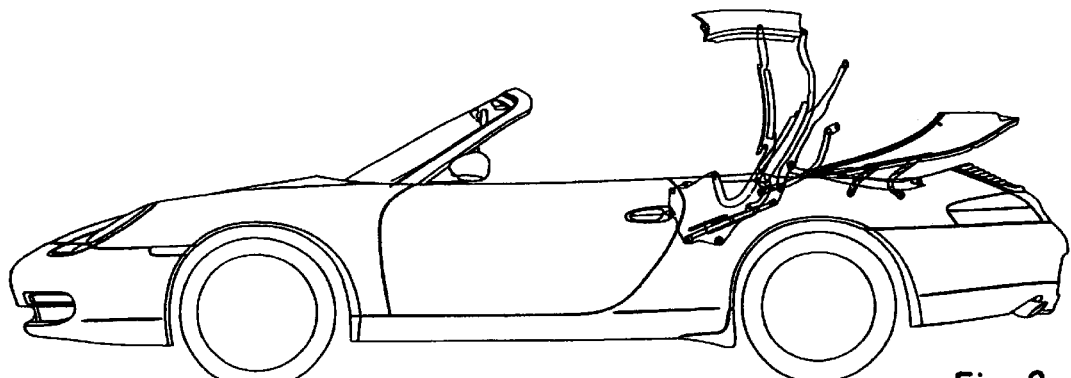
FIG. 2 is a view of the vehicle according to FIG. 1, in which is folding top is in a half-open position.
Figure 3:
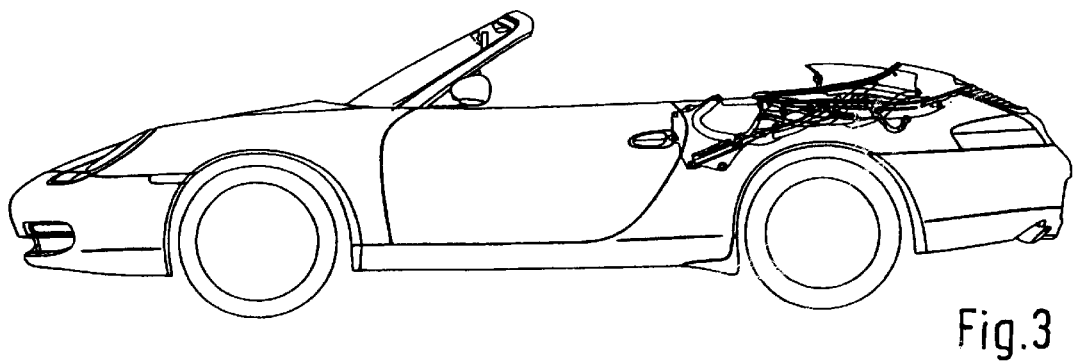
FIG. 3 is a view of the vehicle according to FIG. 1, in which the folding top is in its fully open position.

A vehicle 1 is provided with a folding top 2 which can be changed from a closed position of FIG. 1 by way of a partially open position in FIG. 2 to a fully open position in FIG. 3. For operating the folding top 2, a switch 3 is provided inside the vehicle which has two switching positions, specifically "opening" and "closing".

Figure 4:
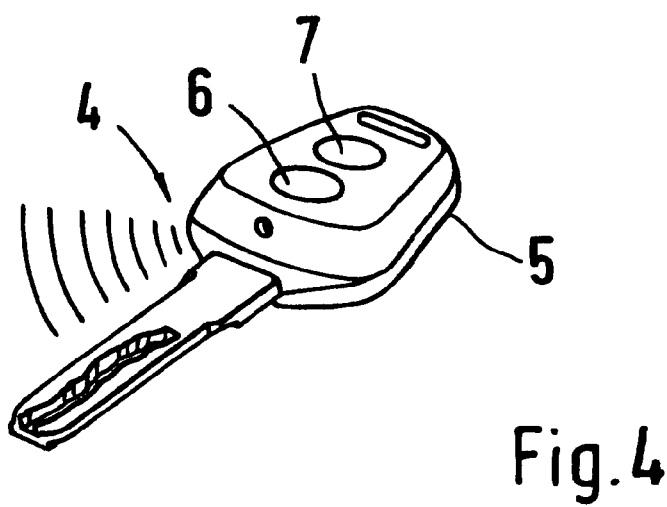
FIG. 4 is a view of a key with a remote control device.

For locking and unlocking the vehicle, a remote control device 5 is provided on a key 4 illustrated in FIG. 4. This remote control device 5 has two push buttons 6 and 7 and is wirelessly connected with the vehicle. The first push button 6 is provided for locking and unlocking the vehicle. The second push button 7 is used as a control device for operating the folding top 2.

When the second push button 7 is operated, it is first examined whether the folding top 2 had already been moved. This examination is conducted within a defined time period T1, for example, 2 seconds, before the current operation of the second push button 7. If it is determined that top 2 has been moved, the current operation of the second push button 7 is therefore an operation which directly follows the preceding operation of the roof 2. In this case, the moving direction of the roof is reversed with respect to the moving direction of the previously occurred operating direction of the roof.

Subsequently, it is examined whether the roof is completely open or closed. If the roof 2 is completely open, a closing operation of the roof 2 is initiated independently of the previously carried out examination. When the roof 2 is completely closed, an opening operation of the roof 2 is initiated independently of the previously carried out examination. If, in contrast, the examination indicates neither of the two conditions, that is, the roof 2 is partially closed (compare FIG. 2), an opening operation is initiated unless the first stages of the examination have determined a different moving direction of the roof 2.

In order to prevent an accidental operation of the roof 2, a movement of the roof 2 is not initiated before the push button 7 has been pressed for a predetermined time period T2, in this case, 2 seconds. However, if it was previously determined that, before the current operation of the second push button 7, the folding top 2 had already been moved within the predetermined time period Ti, a movement of the roof is initiated immediately with the pressing of the push button 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for controlling movement of a vehicle roof that is to be moved by power in opening and closing operating directions, comprising the steps of moving a single triggering element, for both the opening and closing operating directions, and selecting the opening or closing directions with the single triggering element as a function of a position of the roof, the operating directions being determined by sensing whether the roof is fully open, whereby;

if the roof is fully open, a closing operation of the roof is triggered, and if the roof is not fully open, an opening operation of the roof is triggered.

2. Process according to claim 1, wherein the operating direction is first determined by sessing whether a preceding movement of the roof has taken place within a predetermined time period, and if so, triggering a moving operation of the roof in a direction reverse to the preceding movement.

3. Process according to claim 1, wherein the single triggering element is remotely controlled to initiate movement of the roof.

4. Process according to claim 1, wherein the single triggering element is a switch fixed on the vehicle to initiate movement of the roof.

5. Process according to claim 2, wherein the single triggering element is remotely controlled to initiate movement of the roof.

* * * * *